Patented Apr. 7, 1942

2,278,443

UNITED STATES PATENT OFFICE 2,278,443

AUXIN COMPOSITION

Sheldon B. Heath, Midland, Mich., assignor to The Dow Chemical Company, Midland, Mich., a corporation of Michigan No Drawing. Application May 3, 1940, Serial No. 333,111

20 Claims. (Cl. 71—2)

This invention concerns compositions comprising mixtures of a hydrophilic colloid and a solid plant auxin in which the hydrophilic colloid is dispersed in and through the auxin material and held thereby as in solid suspension.

The term "auxin" is herein employed in the sense first suggested by Kögl (Chem. Weekblad 29:317–318 and Forsch. und Fortschr. 8:409–410) and refers to those chemical substances which bring about such growth reaction in higher plants as is conveniently measurable by the curvature of Avena coleoptiles. In the physiological sense the term "auxin" includes the "growth hormones" but is not inclusive of plant stimulant materials which serve solely in a nutrient capacity or of materials such as ammonia or ethylene. Auxin A, auxin B, heteroauxin, and mixtures thereof, as well as numerous auxin-like materials, such as naphthalene acetic acid, naphthalene propionic acid, phenoxy acetic acid, their salts and esters, naphthalene acetamid, etc., are representative of this class of materials. All have been found to initiate and promote rooting action in growing plants.

The use of the auxins frequently requires their dispersion in an inert carrier medium if optimum results are to be obtained. It has been proposed to provide concentrates of such products dissolved in organic solvents, but for economic reasons and to avoid the possibility of undesirable plant reaction to solvents, the most favorable method of operation consists of applying the auxin in aqueous solution or dispersion. In preparing such solutions and suspensions, it is preferable that the solid auxin be available in such a form that it be quickly and completely dispersed or dissolved in water or aqueous solution without the necessity of applying heat thereto.

Efforts to provide solid auxin material in finely-divided form by grinding, etc., have proven impractical due to the tendency of such materials to coalesce into balls which pack together. Furthermore, many of such materials cannot be conveniently stored in finely-divided form since the particles tend to grow together, sublime, or otherwise to reassociate, giving rise to a product containing agglomerates and unsuitable for use in plant treatment preparation where fineness of particle size is of paramount importance. The presence of such large particles in the auxin product results in a slower rate of dispersion or solution. If they are permitted to remain in the ultimate dispersion, they may result in injury to the particular section of plant surface contacted therewith.

An object of this invention is to provide compositions comprising solid auxin materials which on contact with water will disintegrate to give fine dispersions of the auxin. A further object of the invention is to provide compositions comprising solid auxin materials which may be roughly-comminuted and thereafter stored indefinitely without undergoing change in particle size or other chemical or physical alteration. A further object is to provide substantially anhydrous compositions comprising solid auxin materials adapted to be used as a concentrate in the preparation of plant spray compositions. An additional object is to provide a method for the preparation of such compositions. Other objects of the invention will become apparent from the following specification.

I have discovered that the product obtained by heating a mixture of a hydrophilic colloid and a solid auxin material, preferably one melting above 50° C., to a temperature above the melting point of the auxin and thereafter cooling the mixture possesses the characteristic of rapidly disintegrating on contact with water, aqueous solution, or aqueous emulsion to give an initial suspension of minute particles of the solid auxin. Such substantially anhydrous fusion mixtures do not rapidly absorb moisture from the air and are not appreciably affected by exposure to air and light or by prolonged storage. I have further found that such solid dispersions are well adapted for use in the preparation of plant treatment compositions, e. g. aqueous suspensions, dust compositions, and anhydrous emulsion concentrates, wherein it is desired to obtain the auxin either in fine dispersion or in potentially dispersable form.

Auxin A, auxin B, heteroauxin, their homologues, analogues, and derivatives and such compounds as naphthalene-acetic acid, phenoxyacetic acid, and other auxin-like materials are not entirely equivalent. Certain points of difference become apparent upon consideration of the comparative stabilities of the several auxins and compound types concerned. For example, auxin A is stabile to acids but exhibits a sensitivity to alkali. Heteroauxin is somewhat labile in the presence of acid but stabile to alkali. Auxin B, on the other hand, is somewhat affected by both acids and alkalies. With respect to each of these three materials and napthalene-acetic acid and related compounds, certain optimum conditions of pH exist at which the auxin material exerts a maximum effect upon plant metabolism. These peculiarities are generally controlling of the type of compositions in which any particular auxin material is employed and the optimum operating conditions to be observed in connection with the use of the several products.

In the present invention, the question of stability of particular auxin materials is of importance in determining the particular hydrophilic colloid to be combined therewith. Various materials such as bentonite and starch result in aqueous dispersions of varying pH, it being preferable to select a colloidal material which in aqueous dispersion gives a pH which is not detrimental to the particular auxin material employed. It is further to be understood that in selecting auxin materials for preparation of the fusion mixtures to which the present invention is directed, only such materials as have a melting point below their decomposition temperature and which are not inactivated by heating to their fusion temperature are to be empolyed.

One method of preparing the new compositions comprises stirring a finely-divided hydrophilic colloid such as starch or bentonite into a molten auxin material. The resulting slurry is solidified by cooling below the fusion temperature of the mixture, whereby a hard, brittle cake is formed.

An alternate method of procedure consists of first intimately mixing the finely-divided hydrophilic colloid with the auxin in powdered form, as by grinding, and thereafter heating the mixture with stirring to a temperature above the melting point of the auxin material. The fusion mix is then solidified by cooling. In both of the foregoing procedures, the solidified fusion mixture is roughly crushed or ground to a suitable particle size prior to use. A material having an average particle size of from about 5 to 100 screen mesh (U. S. sieve series) has been found satisfactory, although the exact size of the rough grind is not critical.

The proportions of constituents employed vary with the particular materials concerned. In general, from about 20 to 80 parts of the auxin material is combined with sufficient of the hydrophilic colloid to give 100 parts by weight of mixture. From about 30 to about 60 per cent auxin material is preferred. From about 5 to 20 per cent of auxin material in the composition is operable but in such mixture the excess of hydrophilic colloid serves primarily as an inert diluent. The most convenient method of preparing compositions containing these lower concentrations of auxin material, consists of mixing or grinding a more concentrated comminuted fusion product with additional hydrophilic colloid. In this way, products containing 1 per cent or less of the auxin may be obtained which give a fine dispersion of the auxin on contact with water.

When the coarsely ground mixture is wet with water, the particles of hydrophilic colloid mechanically held in the solidified auxin crystals rapidly swell and the solid product disintegrates to form a slurry of swelled particles of the colloid and a fine dispersion of the auxin material in the form of fine crystal segments, the majority of which are between 1 and 3 microns in diameter.

Wetting agents such as sulphite process waste liquor products, spruce extract, sulphonated oils and fatty acids and their salts, sulphated alcohols, blood albumen, phenol sulphonic acid, etc., may be included in the mixtures. Such materials accelerate the rate at which the products wet and disintegrate upon contact with water. These wetting and dispersing agents can, if desired, be added to the fusion mixture during the heating operation, but it is generally preferable to make such addition to the cooled and roughly-ground product by mechanical mixing. Even though the auxin material eventually may dissolve in water following the disintegration, the wetting agent is still of value since it continues to function in the diluted composition when the latter is employed for plant treatment purposes.

In a preferred embodiment of the present invention, bentonite is employed as the hydrophilic colloid. The optimum proportions of auxin in combination with bentonite are between 30 per cent and 60 per cent by weight of the auxin in the composition. The entire range of from 1 to 80 per cent by weight of the auxin is workable, but it has been found that a higher percentage of particles of minimum diameter result from the disintegration of fusion mixtures, wherein the bentonite is employed in the indicated preferred proportions. When less than the recommended proportion of bentonite is employed, there are sometimes particles of a diameter as high as 20 microns in the disintegrated slurry. With those auxin materials in which the rate of solution is very rapid, this condition is not important, but with others which are difficultly scluble or substantially insoluble in water, the presence of such larger crystal segments is disadvantageous.

The following examples describe the preparation and properties of certain compositions which have been found suitable, but are not to be construed as limiting the invention.

*Example 1*

8 grams of alpha-naphthalene-acetic acid (M. P. 133° C.) and 16 grams of bentonite were ground together in a small ball mill for one-half hour. The powdery mixture was then placed in a porcelain crucible and heated slowly with constant stirring to a temperature of 145° C. The mixture was then cooled and ground in a mortar to pass 100 screen mesh. The roughly-ground product was readily wettable and disintegrated on stirring with water to give a dispersion of naphthalene-acetic acid in the form of particles having an average diameter of less than 3 microns.

A portion of the roughly-comminuted mixture was mixed with sodium lauryl sulphate to form a composition adapted to be employed as a concentrate for the preparation of aqueous plant treatment materials.

*Example 2*

60 grams of alpha-naphthalene-acetic acid was heated to a temperature of 140° C. and 40 grams of bentonite was added portion-wise and with stirring to the molten auxin material. This mixture was then cooled to form a friable cake, and thereafter crushed to obtain a product having an average particle size of approximately 10 screen mesh. Portions of this relatively coarse material were mixed with such wetting agents as dried sulphite waste liquor, and the sodium salt of phenol sulphonic acid to obtain concentrates which disintegrated rapidly on contact with water and were adapted to be employed in the preparation of aqueous plant treatment compositions.

*Example 3*

In a similar manner 30 grams of alpha-naphthalene-acetic acid and 70 grams of finely-divided starch were ground together in a ball mill and thereafter heated to a temperature of 140° C. to obtain a fusion mixture which after cooling and grinding was found to disintegrate rapidly with water to give a dispersion of alpha-naphthalene-acetic acid crystal segments having an average diameter size from 1 to 3 microns.

An analogous composition was prepared by stirring 40 grams of starch into 60 grams of molten alpha-naphthalene-acetic acid and thereafter cooling and roughly grinding the mixture.

*Example 4*

Similar compositions adapted for use as concentrates in the preparation of aqueous plant treatment materials include the following:

| | Percent by weight |
|---|---|
| Methyl naphthalene acetic acid (M. P. 122°–4° C.) | 80 |
| Bentonite | 20 |
| Acenaphthalene-acetic acid (M. P. 174°–5° C.) | 70 |
| Starch | 30 |
| Monobromo-naphthalene-acetic acid (M. P. 122°–8° C.) | 50 |
| Starch | 50 |
| Monochloro-naphthalene acetic acid (M. P. 124° C.) | 60 |
| Bentonite | 40 |
| Anthracene-acetic acid (M. P. 189° C.) | 40 |
| Methyl cellulose | 60 |
| Phenoxy acetic acid (M. P. 101–101.5° C.) | 20 |
| Starch | 80 |
| Indole-propionic acid | 50 |
| Bentonite | 50 |
| Alpha-naphthalene acetamid | 40 |
| Methyl cellulose | 60 |

Other modes of applying the principle of my invention may be employed instead of those explained, change being made as regards the products and methods herein disclosed, provided the composition or steps stated by any of the following claims or the equivalent of such stated compositions or steps be employed.

I, therefore, particularly point out and distinctly claim as my invention:

1. A roughly-comminuted composition of matter comprising as major constituents a solid auxin material and a hydrophilic colloid, the latter being in solid suspension in said auxin, which composition is capable of disintegrating on contact with water to form a suspension comprising the solid auxin compound in finely-divided form.

2. A roughly-comminuted composition of matter comprising from 1 to 80 parts by weight of a solid auxin and at least 20 parts by weight of a hydrophilic colloid, at least a portion of the latter being in solid suspension in the auxin.

3. A composition comprising a solid suspension of a hydrophilic colloid in a solid auxin compound and prepared by stirring the hydrophilic colloid into said auxin at temperatures above the melting point of the latter, thereafter cooling the mixture to solidify the same, and roughly comminuting the resulting cake.

4. A roughly-comminuted composition of matter comprising as major constituents a wetting agent, a solid auxin compound, and a hydrophilic colloid, the latter being in solid suspension in the auxin.

5. A roughly-comminuted composition of matter comprising as major constituents a wetting agent, an auxin compound melting above 50° C., and a hydrophilic colloid, the latter being in solid suspension in the auxin, which composition is capable of disintegrating on contact with water to form a suspension comprising the solid auxin compound in finely-divided form.

6. A roughly-comminuted composition of matter comprising as major constituents alpha-naphthalene-acetic acid and a hydrophilic colloid, the latter being in solid suspension in the naphthalene acetic acid, which composition is capable of disintegrating on contact with water to form a suspension of the alpha-naphthalene-acetic acid in finely-divided form.

7. A roughly-comminuted composition of matter comprising from 1 to 80 parts by weight of alpha-naphthalene-acetic acid and at least 20 parts by weight of a hydrophilic colloid, at least a portion of the latter being in solid suspension in the alpha-naphthalene-acetic acid.

8. A composition comprising a solid suspension of a hydrophilic colloid in alpha-naphthalene-acetic acid and prepared by stirring the hydrophilic colloid into the alpha-naphthalene-acetic acid at a temperature above the melting point of the latter, thereafter cooling the mixture to solidify the same, and roughly comminuting the resulting cake.

9. A roughly-comminuted composition of matter comprising as major constituents a wetting agent, alpha-naphthalene-acetic acid, and a hydrophilic colloid, at least a portion of the latter being in solid suspension in the alpha-naphthalene-acetic acid.

10. A roughly-comminuted composition of matter comprising as major constituents an auxin compound melting above 50° C. and bentonite, the latter being in solid suspension in said auxin, which composition is capable of disintegrating on contact with water to form a suspension comprising the auxin in finely-divided form.

11. A roughly-comminuted composition of matter comprising from 1 to 80 parts by weight of an auxin melting above 50° C. and at least 20 parts by weight of bentonite, at least a portion of the latter being in solid suspension in said auxin.

12. A roughly-comminuted composition of matter comprising as major constituents an auxin compound melting above 50° C., and starch, the latter being in solid suspension in said auxin, which composition is capable of disintegrating on contact with water to form a suspension comprising the auxin in finely-divided form.

13. A roughly-comminuted composition of matter comprising from 1 to 80 parts by weight of an auxin melting above 50° C., and at least 20 parts by weight of starch, at least a portion of the latter being in solid suspension in the auxin.

14. A roughly-comminuted composition of matter comprising as major constituents alpha-naphthalene-acetic acid and bentonite, the latter being in solid suspension in the alpha-naphthalene-acetic acid, which composition is capable of disintegrating on contact with water to form a suspension comprising the alpha-naphthalene-acetic acid in finely-divided form.

15. A roughly-comminuted composition of matter comprising from 1 to 80 parts by weight of alpha-naphthalene-acetic acid and at least 20 parts by weight of bentonite, at least a portion of the latter being in solid suspension in the alpha-naphthalene-acetic acid.

16. A roughly-comminuted composition of matter comprising as major constituents a wetting agent, alpha-naphthalene-acetic acid, and bentonite, the latter being in solid suspension in the alpha-naphthalene-acetic acid.

17. A roughly-comminuted composition of matter comprising as major constituents alpha-naphthalene-acetic acid and starch, the latter being in solid suspension in the alpha-naphthalene-acetic acid, which composition is capable of disintegrating on contact with water to form a suspension comprising the alpha-naphthalene-acetic acid in finely-divided form.

18. A roughly-comminuted composition of matter comprising from 1 to 80 parts by weight of alpha-naphthalene-acetic acid and at least 20 parts by weight of starch, at least a portion of the latter being in solid suspension in the alpha-naphthalene-acetic acid.

19. A roughly-comminuted composition of matter comprising as major constituents a wetting agent, alpha-naphthalene-acetic acid, and starch, the latter being in solid suspension in the alpha-naphthalene-acetic acid.

20. A roughly-comminuted composition of matter comprising as major constituents an auxin material melting above 50° C., and methyl cellulose, the latter being in solid suspension in said auxin, which composition is capable of disintegrating on contact with water to form a suspension comprising the auxin in finely-divided form.

SHELDON B. HEATH.